June 16, 1959  A. QUINCHE  2,890,482
DEVICE FOR ADAPTING A TUBULAR BLANK TO A SHAPING MANDREL
Filed Feb. 16, 1955  2 Sheets-Sheet 1
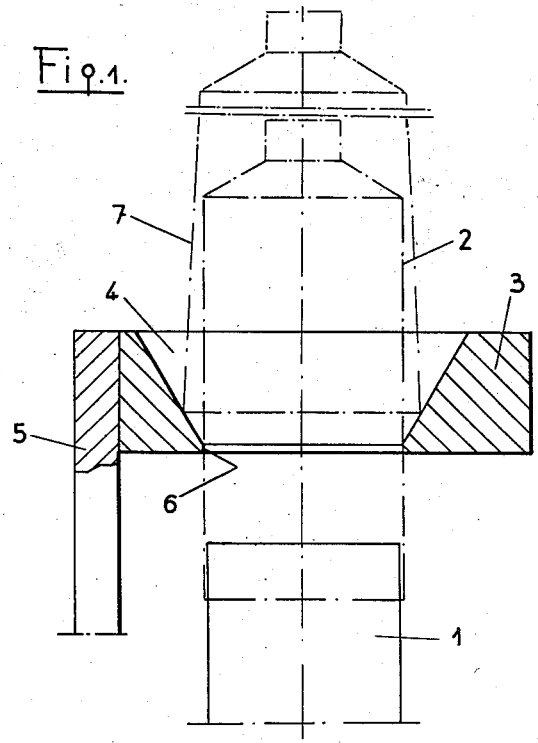
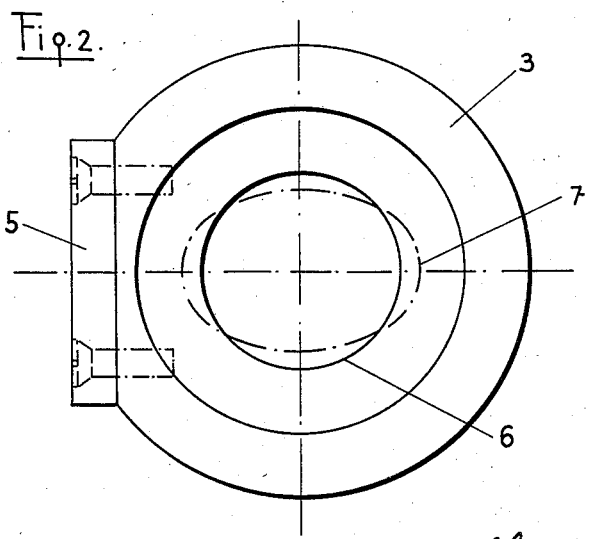

INVENTOR.
ALBERT QUINCHE
BY Russell L. Root
George W. Reiber
ATTORNEYS

United States Patent Office 2,890,482
Patented June 16, 1959

2,890,482
DEVICE FOR ADAPTING A TUBULAR BLANK TO A SHAPING MANDREL

Albert Quinche, St. Sulpice, Switzerland, assignor, by mesne assignments, to American Can Company, New York, N.Y., a corporation of New Jersey Application February 16, 1955, Serial No. 488,630

Claims priority, application Switzerland February 27, 1954

1 Claim. (Cl. 18—1)

It is known that when manufacturing certain tubular articles, for example flexible tubular containers made of a plastic substance such as polyethylene for preserving and delivering products such as creams or pastes, it frequently happens that the blank of the tubular container whether or not provided with a head portion or a bottom portion must be fitted upon a mandrel adapted to support the same during a manufacturing phase of said container. It is also known that during certain steps in the manufacture of such tubular containers, for example as the head portion is molded into position upon the blank or as the latter is subjected, for example, to roller printing, it is desirable that the distortable shell of the blank should be perfectly supported by the mandrel throughout its length or at least in the neighborhood of its head-receiving end portion. The mandrel should therefore have a substantially constant cross sectional area right up to its free end. However the absence of any substantial conicity in the free end portion of the mandrel makes it difficult swiftly to set container blanks thereon, especially since the blanks may be irregular in shape due to distortion under crushing or piling up stresses when they are stored at intermediate stages of their manufacturing process.

An object of the invention is to provide a device for facilitating the setting into correct position of a distortable tubular article such as a flexible container blank upon a shaping mandrel of a dimension closely fitting the tubular article.

Another object of the invention is to provide a device as aforesaid wherein the frictional strains arising during the mutual engagement of the tubular article and supporting mandrel are minimized, while said article is satisfactorily guided into position upon the mandrel.

A still further object of the invention is to provide a device as aforesaid of extremely simple and sturdy construction specially suited for properly shaping tubular container blanks made of a polyethylene even when said containers have undergone distortion following prolonged storing under conditions liable to cause them to lose their correct shape and outline.

With these and such other objects in view as will presently appear hereinafter, the invention comprises the novel construction and combination of parts that will now be described with reference to the accompanying diagrammatic drawing exemplifying the same and forming a part of the present disclosure.

In the drawing:

Figure 1 is a sectional elevational view of the device according to the invention.

Figure 2 is a top plan view of the same.

Figure 3:
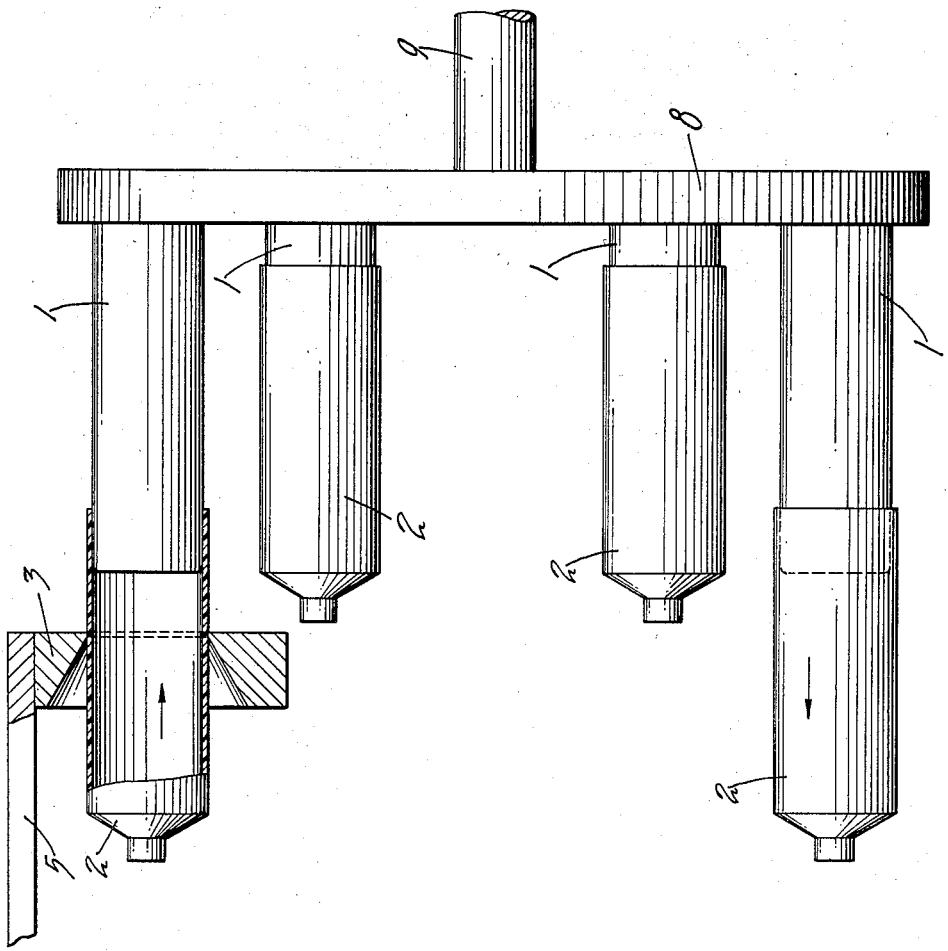
Fig. 3 is a side elevation, partly in section illustrating a movable supporting means, for a plurality of mandrels whereby each mandrel is transferred to and from a loading station or position in cooperative relation to a guide for placing tubular blanks on the mandrels.

As above stated, the device according to the invention is adapted to facilitate the setting into proper position of a pliant article such as a tubular plastic container blank 2 made of polyethylene or the like of conventional shape on a cylindrically shaped carrier or mandrel 1 having a smooth or polished end portion. The device includes a guiding member 3 having a passage 4 therethrough and sustained by a lateral support or bracket 5. The surface of the passage 4 has a tapering or conical shape over the major portion of its length to form a converging channel but terminates in a short cylindrical portion 6 having substantially the same diameter (with such proper allowance for variations of wall thickness as are normally provided when making articles of this sort) as the blank 2 when the latter has been threaded or telescoped over the mandrel 1.

Owing to the converging shape of the passage 4 in its upper tapering portion, the shell of the tubular blank 2, which may sometimes have a marked ovalization as shown in broken lines at 7 (see Fig. 2), for example due to prolonged storage in bulk, is gradually brought into conformity within the minimum circular cross section at the lower portion of the passage 4 as the blank 2 is gradually progressed through the guiding member 3.

Owing to its resiliency, the shell wall of the tubular blank 2 then assumes the required shape corresponding to that of the mandrel, whereupon said blank may be slipped without difficulty upon the mandrel 1 located opposite and in line with portion 6 of the passage 4, although the end portion of said mandrel is relatively blunt and has a diameter substantially equal to the inner diameter of the blank.

It will be noticed that the converging portion of the passage 4 is in the shape of a hollow cone frustum and the diameter of its upper mouth is larger than the maximum width that the blank shell would have if completely crushed or collapsed i.e. half the periphery of the portion 6 of the passage 4.

Furthermore the surface of the portion 6 of the passage is advantageously polished for minimizing resistance to travel of the blank 2 due to friction.

The device as illustrated permits a very high loading rhythm and efficiency to be achieved on machines comprising a plurality of mandrels arranged to be sequentially brought into registration with the device 3, no matter whether the tubular blanks are manually pushed through the passage 4 or an automatic charging system is provided for that purpose. An arrangement of this sort is very generally illustrated in Fig. 3 wherein a plurality of mandrels 1 are mounted on a moving means therefor, here shown as an indexible dial or table 8 with means 9 for intermittently driving the same. As the table 8 is indexed each mandrel 1 is brought in turn to a loading station opposite and in line with the guiding member 3 to receive a tubular blank 2 in the manner previously described, and then moved away to a doffing station, e.g. the lowermost position in Fig. 3, where it may be removed. Any suitable treatment or process is, of course, effected in the meantime at one or more intermediate stations.

Although a circular cross sectional shape is the commonest of all shapes that such articles may assume, it should be understood that the present device may be also adapted to the treatment of articles having a non-circular cross section, for instance an elliptical or oval cross section.

Minor constructional details of the device may be varied without departing from the scope of the subjoined claim.

What is claimed is:

In combination, a cylindrical supporting mandrel having a blunt forward end substantially free of any lead-in or guiding surfaces and designed to fit snugly the interior surface of a distortable tubular plastic blank, and a device for facilitating setting such a blank into correct position on said mandrel via said free end, said device comprising a guiding means having a guiding passage therethrough in alignment with the mandrel and spaced a short distance axially from the forward end thereof, said passage including an entering tapered wall surface converging towards the mandrel and which occupies the majority of the length of the passage, and a short cylindrical exit wall surface at the end towards said mandrel of a substantially similar peripheral shape to that of the curved cross section of the mandrel and of a size substantially equal to that of the cross section of the mandrel increased by the wall thickness of the blank to be set thereon, said tapered wall surface also having its entering end of minimum diameter at least equal to one-half the periphery of the exit wall surface whereby a tubular blank entered endwise into the passage from the side opposite the mandrel and pushed therethrough will be conformed accurately to the mandrel shape and will be so stiffened and conditioned as to be received on the snugly fitting mandrel smoothly without guiding assistance other than from the said guiding means and without interference from the blunt forward end of the mandrel regardless of the initial configuration of the tube.

References Cited in the file of this patent

UNITED STATES PATENTS

| | | |
|---|---|---|
| 368,622 | Sandford | Aug. 23, 1887 |
| 2,446,281 | Harding | Aug. 3, 1948 |
| 2,611,154 | Chevrier | Sept. 23, 1952 |
| 2,683,900 | Lotz | July 20, 1954 |
| 2,684,524 | Beck | July 27, 1954 |